(12) United States Patent
Felton et al.

(10) Patent No.: US 11,891,909 B2
(45) Date of Patent: Feb. 6, 2024

(54) SYSTEM AND METHOD FOR AN ELECTRIC TURBOCHARGER

(71) Applicant: Transportation IP Holdings, LLC, Norwalk, CT (US)

(72) Inventors: Adam Felton, Grove City, PA (US); Christopher Homison, Wattsburg, PA (US); Louis Kobielski, Sherman, NY (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 18/159,467

(22) Filed: Jan. 25, 2023

(65) Prior Publication Data

US 2023/0272723 A1 Aug. 31, 2023

Related U.S. Application Data

(60) Provisional application No. 63/268,673, filed on Feb. 28, 2022.

(51) Int. Cl.
*F01D 25/18* (2006.01)
*F01D 25/16* (2006.01)
*F01D 15/10* (2006.01)

(52) U.S. Cl.
CPC ............. *F01D 25/18* (2013.01); *F01D 15/10* (2013.01); *F01D 25/162* (2013.01); *F05D 2220/40* (2013.01); *F05D 2240/52* (2013.01); *F05D 2260/602* (2013.01); *F05D 2260/98* (2013.01)

(58) Field of Classification Search
CPC ........ F01D 25/18; F01D 15/10; F01D 25/162; F05D 2220/40; F05D 2240/52; F05D 2260/602; F05D 2260/98
See application file for complete search history.

(56) References Cited

U.S. PATENT DOCUMENTS

| | | | | |
|---|---|---|---|---|
| 10,119,459 B2* | 11/2018 | Fraser | ................... | F04D 29/284 |
| 2003/0051475 A1* | 3/2003 | Allen | ........................ | F02C 6/12 |
| | | | | 60/608 |
| 2010/0175377 A1* | 7/2010 | Hippen | ..................... | F02C 6/12 |
| | | | | 60/602 |
| 2010/0284824 A1* | 11/2010 | Hippen | ..................... | F02C 6/12 |
| | | | | 415/110 |

* cited by examiner

*Primary Examiner* — Jacob M Amick
*Assistant Examiner* — Charles J Brauch
(74) *Attorney, Agent, or Firm* — McCoy Russell LLP

(57) ABSTRACT

Methods and systems are provided for electric turbochargers. In one example, a turbocharger comprises a shaft coupling a compressor wheel to a turbine wheel, an electric machine including a stator encircling the shaft between the compressor wheel and the turbine wheel, and an oil supply passage formed in a housing of the electric machine and fluidly coupled to a first oil nozzle oriented toward the shaft.

19 Claims, 13 Drawing Sheets

SYSTEM AND METHOD FOR AN ELECTRIC TURBOCHARGER

CROSS-REFERENCE TO RELATED APPLICATIONS

The present application claims priority to U.S. Provisional Application No. 63/268,673, entitled "SYSTEM AND METHOD FOR AN ELECTRIC TURBOCHARGER", and filed on Feb. 28, 2022. The entire contents of the above-listed application are hereby incorporated by reference for all purposes.

BACKGROUND

Technical Field

Embodiments of the subject matter disclosed herein relate to electric turbochargers.

Discussion of Art

Vehicles, such as rail vehicles, other off-highway vehicles, and highway vehicles may include an engine, e.g., an internal combustion engine, combusting mixtures of fuel and air. In some examples, power output by the engine may be augmented by compressing intake air prior to combustion at the engine, thereby increasing air charge, e.g., a density of oxygen molecules, and allowing a corresponding amount of injected fuel to be increased. Compression of intake air may be achieved by implementing a turbocharger in the vehicle, with a compressor of the turbocharger coupled to an air intake system of the engine and a turbine of the turbocharger coupled to an exhaust system of the engine. The turbine and compressor are connected by a shaft and rotation of the turbine, as driven by exhaust gas flow, drives rotation of the compressor.

In some instances, replacement of a turbocharger with an electric turbocharger, e.g., an e-turbo, may be desired. The e-turbo, however, may rely on an alternator coupled to the shaft connecting the turbine and the compressor. In order to accommodate positioning of the alternator along the shaft, changes to surrounding components may be demanded. It may be desirable to have a system and a method that differ from those that are currently available.

BRIEF DESCRIPTION

In one embodiment, a turbocharger system is provided that includes a shaft coupling a compressor wheel to a turbine wheel, an electric machine including a stator encircling the shaft between the compressor wheel and the turbine wheel, and an oil supply passage formed in a housing of the electric machine and fluidly coupled to a first oil nozzle oriented toward the shaft.

In one embodiment, a method is provided that includes flowing oil through an oil supply passage of an electric turbocharger to an oil nozzle arranged within the electric turbocharger.

DETAILED DESCRIPTION

Figure 1:
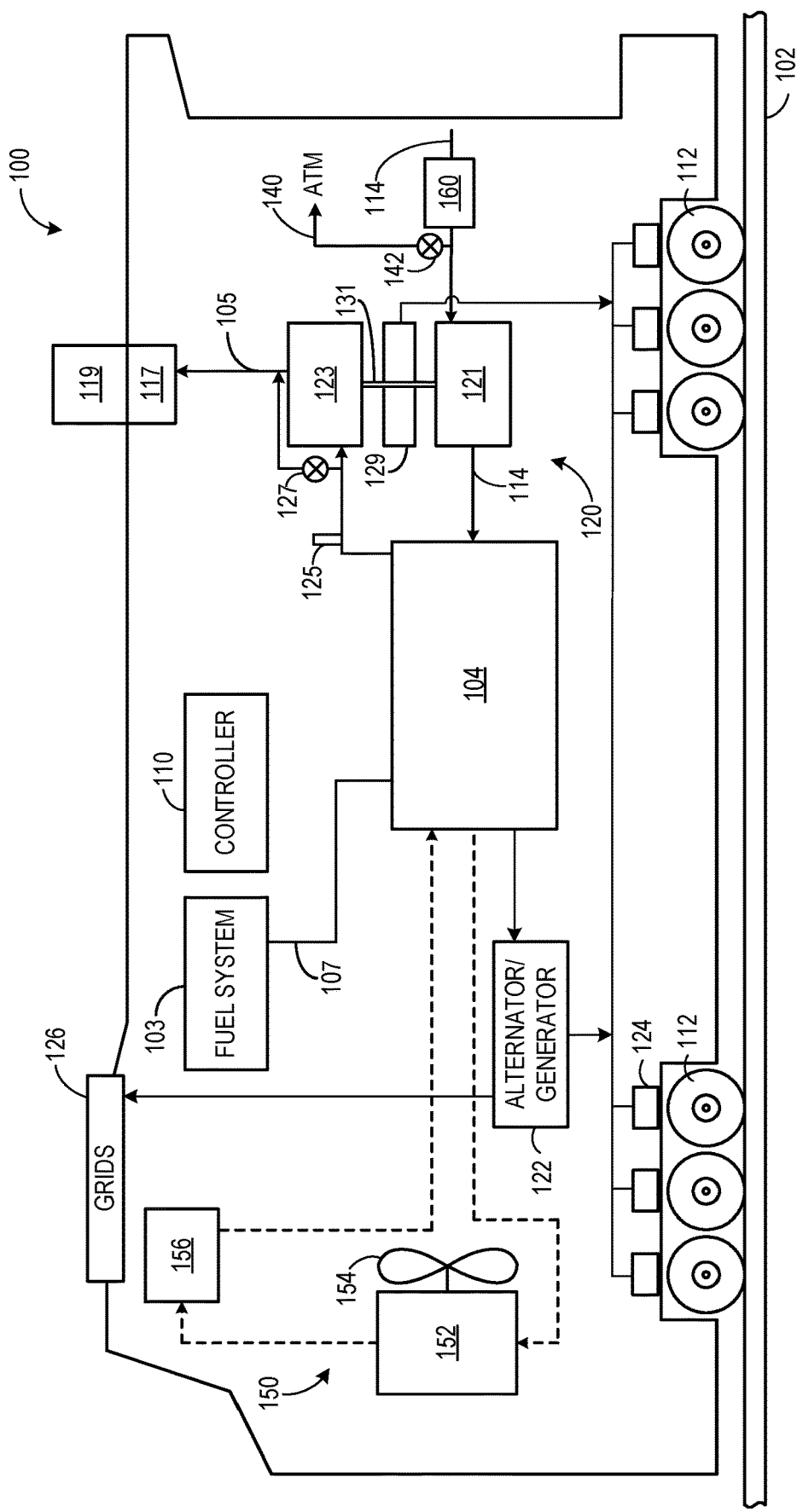
FIG. 1 shows a vehicle system including an electric turbocharger.

Embodiments of the invention are disclosed in the following description and may relate to methods and systems for electric turbochargers. Other embodiments may relate to methods and systems for a multi-fuel system of an internal combustion engine (ICE) that includes the e-turbo. The ICE may operate via a combination of different fuels. These fuels may have relatively different amounts of carbon. In one example, the ICE may be a multi-fuel engine that combusts a plurality of fuels. Each of the plurality of fuels may be stored in separate fuel tanks. In one embodiment, one or more of the fuels and its corresponding fuel tank may be housed in a different fuel tank including a different fuel. In one example, a gaseous fuel tank that is selectively fillable with a gaseous fuel may be arranged within an interior volume of a liquid fuel tank that is selectively fillable with a liquid fuel.

The ICE may combust one or more of gasoline, diesel, hydrogenation-derived renewable diesel (HDRD), alcohol(s), ethers, ammonia, biodiesels, hydrogen, natural gas, kerosene, syn-gas, cryogenic fuels, and the like. The plurality of fuels may include gaseous fuels, liquid fuels, and solid fuels, alone or in combination. A substitution rate of a primary fuel of the ICE with a secondary fuel may be determined based on a current engine load. In one embodiment, the substitution rate may correspond to an injection amount of a fuel with a relatively lower carbon content or zero carbon content (e.g., hydrogen gas or ammonia). As the substitution rate increases, the relative proportion of fuel with the lower or zero carbon content increases and the overall amount of carbon content in the combined fuel lowers. Additionally or alternatively, the substitution rate may correspond to an injection amount or delivery of a gaseous fuel relative to a liquid fuel. In some examples, the substitution rate may be adjusted in response to an operating parameter of an electric turbocharger (e-turbo).

In one example, the ICE may combust fuels that include both diesel and hydrogen. During some operating modes, the ICE may combust only diesel, only hydrogen, or a combination thereof (e.g., during first, second, and third conditions, respectively). When hydrogen is provided, operating conditions may be adjusted to promote enhanced combustion of the hydrogen. The engine system may combust a mixture of three or more fuels including diesel, hydrogen, and ammonia. Additionally or alternatively, ethanol may be included in the combustion mixture.

In one example, systems and methods for the multi-fuel engine may include combusting a primary fuel in combination with one or more secondary fuels. The multi-fuel engine may combust the primary fuel alone. During some conditions, the multi-fuel engine may decrease an amount of primary fuel used via substituting one or more secondary fuels into a combustion mixture. The secondary fuels may include a reduced carbon-content relative to the primary fuel. Additionally or alternatively, the secondary fuels may be less expensive, more available, and/or more efficient. The secondary fuels may vary in ignitibility and burn rate. An ignition timing of the multi-fuel engine may be adjusted in response to the combustion mixture to account for inclusion of the secondary fuels. For example, the ignition timing may be retarded as an amount of hydrogen is increased. As another example, the ignition timing may be advanced as an amount of ammonia is increased. The ignition timing may be further adjusted in this way in response to addition and subtraction of the primary and one or more secondary fuels to the combustion mixture. By doing this, knock and pre-combustion may be mitigated.

Embodiments of the system described herein may include a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms may include self-propelled vehicles. Such vehicles can include on-road transportation vehicles (e.g., automobiles), mining equipment, marine vessels, aircrafts, rail vehicles, and other off-highway vehicles (OHVs). For clarity of illustration, a rail vehicle such as a locomotive may be provided as an example of a mobile platform. In one example, a vehicle system may include an engine, a turbocharger, an aftertreatment system, a fuel system, and a control system.

Referring to FIG. 1, a block diagram of a vehicle system 100 is shown. The vehicle system shown is a rail vehicle (e.g., a locomotive). The vehicle system is shown including an engine 104 and is supported by a plurality of wheels 112 on rails 102. A suitable engine may be an internal combustion engine including a plurality of combustion chambers (e.g., cylinders). The cylinders of the engine may receive fuel from a fuel system 103 via a fuel conduit 107. In some embodiments, the fuel conduit may be coupled with a common rail fuel line, a fuel pump, an accumulator, and a plurality of fuel injectors. In other embodiments, other fuel converting power sources may be used. An example of an alternative may be a fuel cell, or an internal combustion engine/fuel cell combination.

The engine may receive intake air for combustion from an intake passage 114. The intake air includes ambient air from outside of the vehicle flowing into the intake passage through an air filter 160. The intake passage may include and/or be coupled to an intake manifold of the engine. Exhaust gas resulting from combustion in the engine is supplied to an exhaust passage 105. Exhaust gas flows through the exhaust passage to a muffler 117 and out of an exhaust stack 119.

In some embodiments, the engine may be a multi-fuel engine that combusts air and two or more fuels. Suitable fuels may be liquid, gaseous, or a combination thereof. Suitable liquid fuels may include gasoline, kerosene, diesel fuel (to include HDRD and biodiesel), or other petroleum distillates, or alcohol or dimethyl ether. Other liquid fuels may include those of a density that may engage compression ignition. Suitable gaseous fuels may include natural gas, propane, syn gas, hydrogen, ammonia, and the like, and mixture of two or more of the foregoing. While compression ignition is contemplated in some embodiments, other ignition, such as spark ignition, and/or other forms of ignition such as laser, plasma, or the like may be used in some embodiments. As explained further below, the engine may operate in a multi-fuel mode where two or more fuels are simultaneously combusted in engine cylinders or in a single-fuel mode where only a single fuel is combusted in the engine cylinders. In some embodiments, the single-fuel mode may be a diesel fuel mode where 100% diesel fuel is combusted at the engine cylinders. In another embodiment, the engine may be a dual fuel engine that combusts a mixture of gaseous fuel and diesel fuel. As used herein, a substitution ratio may refer to a ratio or percentage of a secondary fuel (such as gaseous fuel) to diesel fuel combusted at the engine cylinders. Again, a suitable engine may be a multi-fuel engine operating with diesel fuel and natural gas, but in other embodiments the engine may use other straight/mono fuels such as gasoline, diesel, or natural gas, hydrogen, ammonia, alcohol or may use various combinations of fuels other than diesel and natural gas.

In some embodiments, the vehicle system may include fuel cells (e.g., hydrogen fuel cells) used to provide propulsion of the vehicle system. For example, the vehicle system may convert fuel (e.g., hydrogen) stored within the fuel cells to electrical energy, and the electrical energy may be provided to electric traction motors 124 of the vehicle system to move (e.g., propel) the vehicle system along the rails via torque provided to the plurality of wheels by the energized electric traction motors. In some embodiments, the engine may be selectably activated or deactivated. In such embodiments, the electric traction motors may be energized by the fuel cells to propel the vehicle system with or without combustion of fuel within the engine. As one example, during some conditions, the vehicle system may be propelled via torque provided to the wheels by the traction motors as a result of energization of the traction motors by the fuel cells and without providing torque to the wheels from the engine. During other conditions, the wheels may receive torque from the traction motors due to energization of the traction motors by the fuel cells, and the wheels may additionally receive torque from operation of the engine (e.g., combustion of fuel and air within the cylinders of the engine). During other conditions, the vehicle system may be driven due to torque provided by the engine to the wheels and without energization of the traction motors by the fuel cells.

The vehicle system includes an electric turbocharger 120 that is arranged between the intake passage and the exhaust passage. The electric turbocharger increases air charge of ambient air drawn into the intake passage to provide greater charge density during combustion to increase power output and/or engine-operating efficiency. As shown in FIG. 1, the electric turbocharger includes a compressor 121 (coupled to the intake passage) which is at least partially driven by a turbine 123 (coupled to the exhaust passage). The compressor and turbine are coupled via a shaft 131. While in this case a single electric turbocharger is included, in other embodiments a suitable system may include multiple turbine and/or compressor stages. A temperature sensor 125 may be positioned to measure the temperature in the exhaust passage, upstream of an inlet of the turbine. The temperature sensor may measure a temperature of exhaust gases entering the turbine. As shown in FIG. 1, a wastegate 127 may be disposed in a bypass passage around the turbine. The wastegate may be controlled and/or adjusted, via actuation from the controller, to increase or decrease exhaust gas flow through the turbine. For example, opening the wastegate (or increasing the amount of opening) may decrease exhaust flow through the turbine and correspondingly decrease the rotational speed of the compressor. As a result, less air may enter the engine, thereby decreasing the combustion air-fuel ratio.

The vehicle system may define a compressor bypass passage 140 coupled directly to the intake passage, upstream of the compressor and upstream of the engine. In some embodiments, the compressor bypass passage may be fluidically coupled to the intake passage, upstream of the intake manifold of the engine. The compressor bypass passage may flow to atmosphere, or to an area exterior to the engine. In an alternate embodiment, the compressor bypass passage may be coupled to the intake passage, upstream of the compressor, and the exhaust passage, downstream of the turbine. In yet another embodiment, the compressor bypass passage may instead be an engine bypass passage coupled to the intake passage, downstream of the compressor (and have an engine bypass valve disposed therein) and thus divert airflow away from the engine after the airflow has passed through the compressor.

The compressor bypass passage may divert airflow (e.g., from before the compressor inlet) away from the engine (or intake manifold of the engine) and to atmosphere. In the embodiment where the passage is instead an engine bypass passage, the engine bypass passage may divert boosted airflow (e.g., from the compressor outlet) away from the engine and to atmosphere. A compressor bypass valve (CBV) 142 is positioned in the compressor bypass passage and includes an actuator actuatable by the controller to adjust the amount of intake airflow diverted away from the engine and to atmosphere. In some embodiments, the compressor bypass valve may be a two-position, on/off valve. In another embodiment, the compressor bypass valve may be a continuously variable valve adjustable into a fully open position, fully closed position, and a plurality of positions between fully open and fully closed. When the compressor bypass valve is in the fully closed (or closed) position, airflow may be blocked from flowing to atmosphere via the compressor bypass passage. As a result, all of the intake airflow may travel to the compressor and then to the engine for combustion in the engine cylinders.

The vehicle system shown in FIG. 1 does not include an exhaust gas recirculation (EGR) system. However, in alternate embodiments, the vehicle system may include an EGR system coupled to the engine, which routes exhaust gas from the exhaust passage of the engine to the intake passage downstream of the electric turbocharger. In some embodiments, the exhaust gas recirculation system may be coupled exclusively to a group of one or more donor cylinders of the engine (also referred to a donor cylinder system).

In some embodiments, the vehicle is a diesel-electric vehicle. As depicted in FIG. 1, the engine may be mechanically coupled to an electric power generation system, which includes an alternator/generator 122 and the electric traction motors. In another embodiment, the alternator/generator may include a direct current (DC) generator. A suitable engine may be a diesel engine and/or natural gas engine. The engine may generate a torque output that is transmitted to the electric generator that is, in turn, mechanically coupled to the engine.

The generator may produce electrical power. That electrical power may be stored and/or applied for subsequent propagation to a variety of downstream electrical components. As an example, the generator may be electrically coupled to a plurality of traction motors and the generator may provide electrical power to the plurality of traction motors. As depicted, the plurality of traction motors are each connected to one wheel of the plurality of wheels to provide tractive power to propel the vehicle. One embodiment includes one traction motor per wheel set, while other embodiments may have one traction motor per wheel. As depicted herein, six pairs of traction motors correspond to each of six pairs of motive wheels of the vehicle. In another embodiment, alternator/generator, the traction motor(s), or both may be coupled to one or more resistive grids 126. The resistive grids may dissipate excess engine torque via heat produced by the grids from electricity generated by the alternator/generator. In embodiments where the vehicle is, for example, a marine vessel rather than a locomotive, the traction motor device supplies torque to a propeller shaft.

The bypass passage couples directly to the intake passage, downstream of the air filter and upstream of the engine. The bypass passage may direct intake air to atmosphere. In some embodiments, controller may control the amount of opening of the CBV to adjust an amount of intake air flowing to the engine (e.g., by flowing a portion of the intake air back to atmosphere). For example, the CBV may be a continuously variable valve adjustable into a fully open position, fully closed position, and a plurality of positions between fully open and fully closed. When the CBV is in the fully closed (or closed) position, airflow may be blocked from flowing through the bypass passage to atmosphere.

In some embodiments, the vehicle system may further include an aftertreatment system coupled in the exhaust passage upstream and/or downstream of the turbocharger. In some embodiments, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems.

As depicted in FIG. 1, the vehicle system may include a thermal management system, such as a cooling system 150. The cooling system circulates coolant through the engine to absorb waste engine heat and distribute the heated coolant to a heat exchanger, such as a radiator 152. A fan 154 may be coupled to the radiator to maintain an airflow through the radiator when the vehicle is moving slowly or stopped while the engine is running. In some embodiments, fan speed may be controlled by the controller. Coolant which is cooled by the radiator enters a tank 156. The coolant may then be pumped by a water, or coolant, pump (not shown) back to the engine or to another component of the vehicle system.

The vehicle system may include the engine controller (referred to sometimes simply as a controller) to control various components related to the vehicle. In some embodiments, various components of the vehicle system may be coupled to the controller via a communication channel or data bus. In some embodiments, the controller includes a computer control system. The controller may additionally or alternatively include a memory holding non-transitory computer readable storage media (not shown) including code for enabling on-board monitoring and control of vehicle operation.

The controller may receive information from a plurality of sensors and may send control signals to a plurality of actuators. The controller, while overseeing control and management of the vehicle, may receive signals from a variety of engine sensors, as further elaborated herein, to determine operating parameters and operating conditions, and correspondingly adjust various engine actuators to control operation of the vehicle. For example, the engine controller may receive signals from various engine sensors including, but not limited to, engine speed, engine load (derived from fueling quantity commanded by the engine controller, fueling quantity indicated by measured fuel system parameters, averaged mean-torque data, and/or electric power output from the alternator or generator), mass airflow amount/rate (e.g., via a mass airflow meter), intake manifold air pressure, boost pressure, exhaust pressure, ambient pressure, ambient temperature, exhaust temperature (such as the exhaust temperature entering the turbine, as determined from the temperature sensor), particulate filter temperature, particulate filter back pressure, engine coolant pressure, exhaust oxides-of-nitrogen quantity (from NOx sensor), exhaust soot quantity (from soot/particulate matter sensor), exhaust gas oxygen level sensor, or the like. Correspondingly, the controller may control the vehicle by sending commands to various components such as the traction motors, the alternator/generator, cylinder valves, fuel injectors, a notch throttle, the compressor bypass valve (or an engine bypass valve in alternate embodiments), a wastegate, or the like. Other actively operating and controlling actuators may be coupled to various locations in the vehicle. In some embodiments, adjusting an amount of intake airflow diverted away from the intake manifold and to atmosphere (and thus the amount of boosted intake airflow entering the engine) may include adjusting an actuator of the compressor bypass valve to adjust the amount of airflow bypassing the engine via the compressor bypass passage.

The electric turbocharger shown by FIG. 1 includes an electric machine 129 arranged between the compressor and the turbine. The electric machine may be a motor/generator driven by the shaft of the electric turbocharger. In particular, the shaft is a rotor of the electric machine, where rotation of the shaft may result in generation of electrical energy by the electric machine via electromechanical coupling between the shaft and stator windings of the electric machine. The shaft extends through the stator of the electric machine and is encircled by the stator. The turbine may be driven by exhaust gases of the engine to rotate the shaft, with the rotation of the shaft resulting in generation of electrical energy by the electric machine. In some embodiments, the electrical energy generated by the electric machine may be used to provide motive force to the wheels of the vehicle via energization of the traction motors. The electric turbocharger shown by FIG. 1 may be similar to, or the same as, the electric turbocharger described below with reference to FIGS. 2-12.

A vehicle system, such as the vehicle system shown by FIG. 1, includes an electric turbocharger, such as the electric turbocharger shown by FIGS. 2-12. The electric turbocharger includes an electric machine including a stator and a rotor, where the rotor is a shaft coupling a turbine wheel to a compressor wheel. The electric turbocharger includes an oil supply passage that may provide oil to oil nozzles disposed within the electric turbocharger, as shown by FIGS. 5-11. Each oil nozzle is oriented toward the shaft such that oil sprayed by the nozzles may come into contact with the shaft, and as a result, a cooling of the shaft and other components of the electric turbocharger may be increased. The nozzles are arranged such that oil sprayed by the nozzles is not impeded by oil propelled from a bearing of the shaft by rotation of the bearing and shaft. A thrust load on the shaft may be partially balanced by pressurized air provided to a chamber via a buffer air passage, where the buffer air passage is formed at least in part by a housing of the electric machine. The technical effect of providing the electric turbocharger with the oil supply passage is to increase a cooling of the components of the electric turbocharger while providing a reduced size of the electric turbocharger. The technical effect of providing the electric turbocharger with the buffer air passage formed at least in part by the housing of the electric machine is to increase the thrust load balancing of the electric turbocharger and reduce the size of the electric turbocharger. The oil supply passage flows a fluid for lubrication and/or cooling (e.g., oil), and the buffer air passage flows a buffering fluid (e.g., air), may increase a cooling and durability of components of the electric turbocharger, such as the electric machine, shaft, bearings (e.g., thrust bearings), etc.

Figure 2:
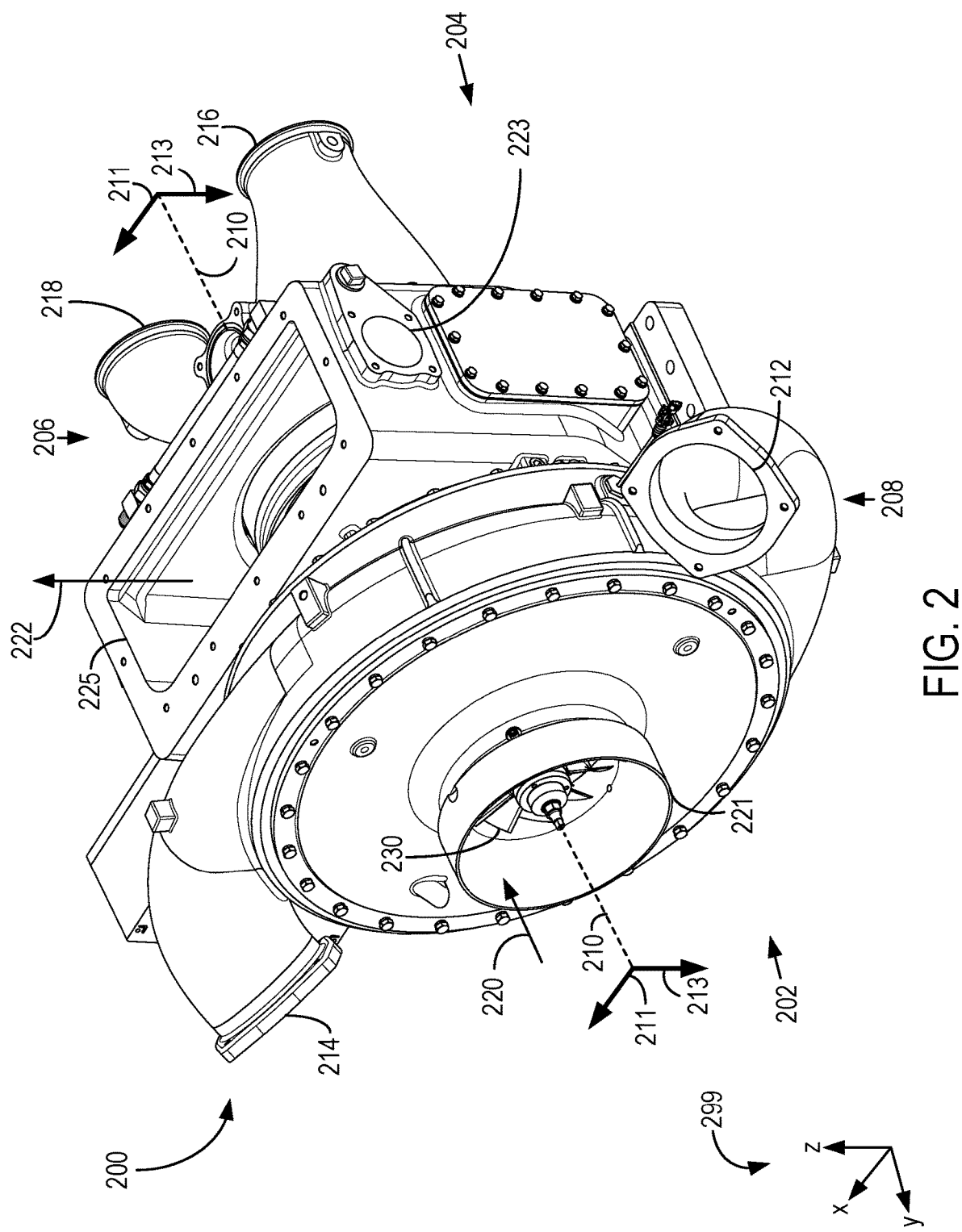
FIG. 2 shows a perspective view of an electric turbocharger at a compressor side of the electric turbocharger.
Figure 3:
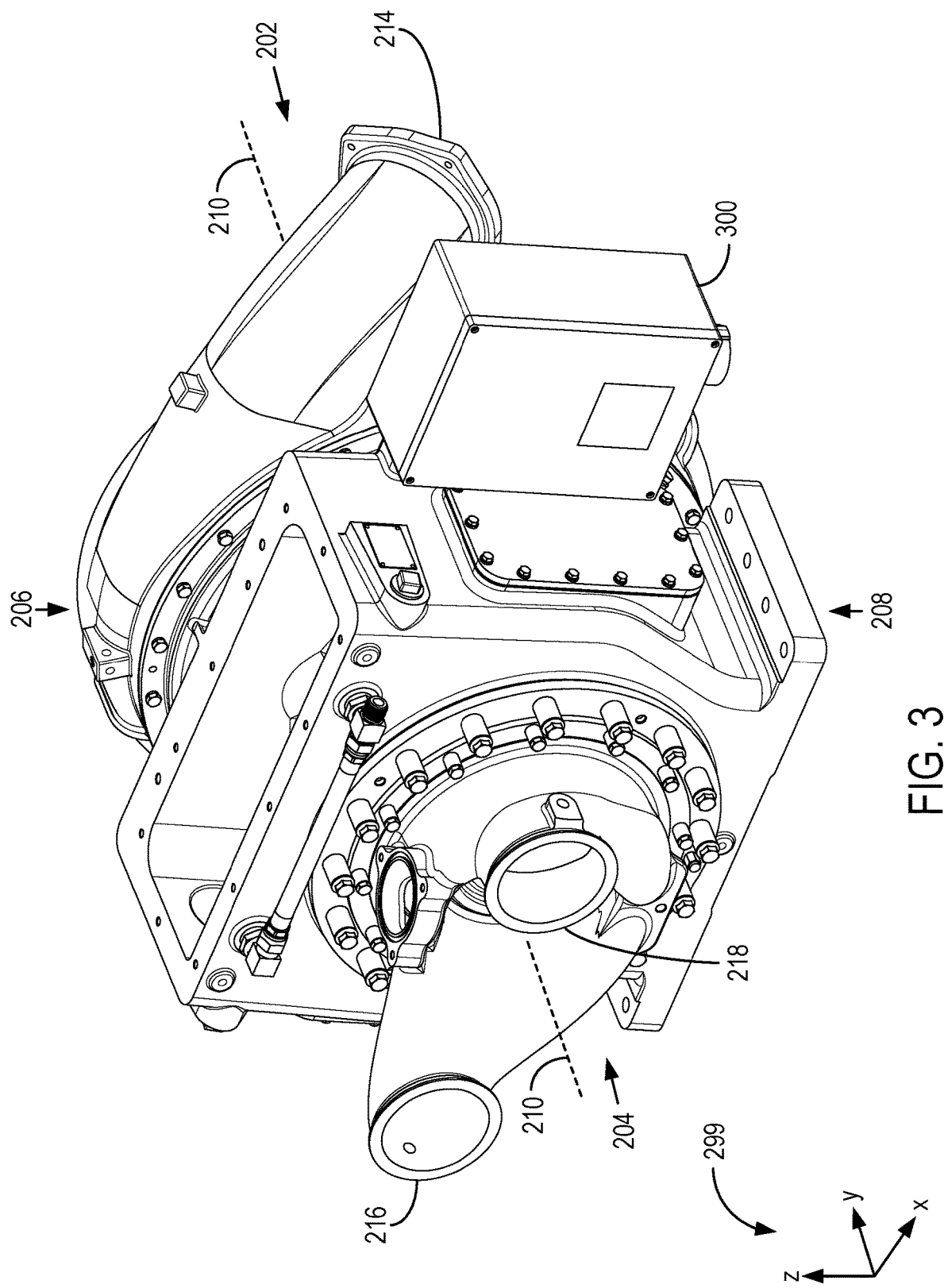
FIG. 3 shows another perspective of the electric turbocharger of FIG. 2 at a turbine side of the electric turbocharger.

Referring collectively to FIGS. 2-3, different perspective views of an electric turbocharger 200 are shown. In particular, FIG. 2 shows a perspective view of the electric turbocharger at a compressor side 202 of the electric turbocharger, and FIG. 3 shows a perspective view of the electric turbocharger at a turbine side 204 of the electric turbocharger. The electric turbocharger may be included within a vehicle system including an engine, such as the vehicle system shown by FIG. 1 and described above. The compressor side and the turbine side are arranged opposite to each other along a central axis 210 of the electric turbocharger. The compressor side of the electric turbocharger may receive intake air from an intake passage of an engine, such as the intake passage described above with reference to FIG. 1, via an intake air inlet 221. For example, the intake passage of the engine may be directly coupled to the intake air inlet of the electric turbocharger at the compressor side, and intake air may flow into the intake air inlet as indicated by arrow 220. The intake air may be compressed by a compressor wheel 230 arranged within the electric turbocharger at the compressor side and may flow out of the electric turbocharger via a first outlet 212 and/or a second outlet 214. Reference axes 299 are included throughout the views for comparison purposes.

The turbine side of the electric turbocharger may receive exhaust gases (e.g., combustion gases) from the engine via a first turbine inlet 216 and/or a second turbine inlet 218. The exhaust gases may flow into the first turbine inlet and/or the second turbine inlet and may rotate a turbine wheel 446 (shown by FIGS. 4-8 and 11-12) arranged within the electric turbocharger at the turbine end. The turbine wheel and the compressor wheel are coupled to each other by a shaft 400 (shown by FIGS. 4-12) such that during conditions in which the turbine wheel is rotated by the exhaust gases flowing into the electric turbocharger at the turbine end via the first turbine inlet and the second turbine inlet, the turbine wheel rotates the shaft and the shaft rotates the compressor wheel. The exhaust gases flowing into the electric turbocharger at the turbine end may flow across surfaces of the turbine wheel and may flow out of an opening 225 of the electric turbocharger at an upper end 206 of the electric turbocharger as indicated by arrow 222. Port 223 may flow a portion of exhaust gases to a turbine bypass valve (e.g., wastegate) during conditions in which the turbine bypass valve is in an opened position. The opening at the upper end of the electric turbocharger may be fluidly coupled to an exhaust passage of the engine such that exhaust gases flowing out of the electric turbocharger via the opening at the upper end may flow to the exhaust passage. The exhaust gases flowing to the exhaust passage may be directed to one or more emissions devices, such as a catalytic converter, before flowing to atmosphere, in some embodiments. During conditions in which the electric turbocharger is coupled to the intake passage and the exhaust passage of the engine as described above, a lower end 208 of the electric turbocharger may be oriented toward a ground surface on which the vehicle sits (e.g., a direction between the upper end and the lower end may be approximately parallel to a direction of gravity). In this orientation, oil sprayed within the electric turbocharger may be directed toward the lower end by gravity, as described further below.

In the embodiment shown, the electric turbocharger includes a junction box 300. The junction box may include cables and/or other electrical connectors that may electrically couple the electric turbocharger to an electrical power source and/or one or more devices driven by electrical power generated by the electrical turbocharger.

Figure 4:
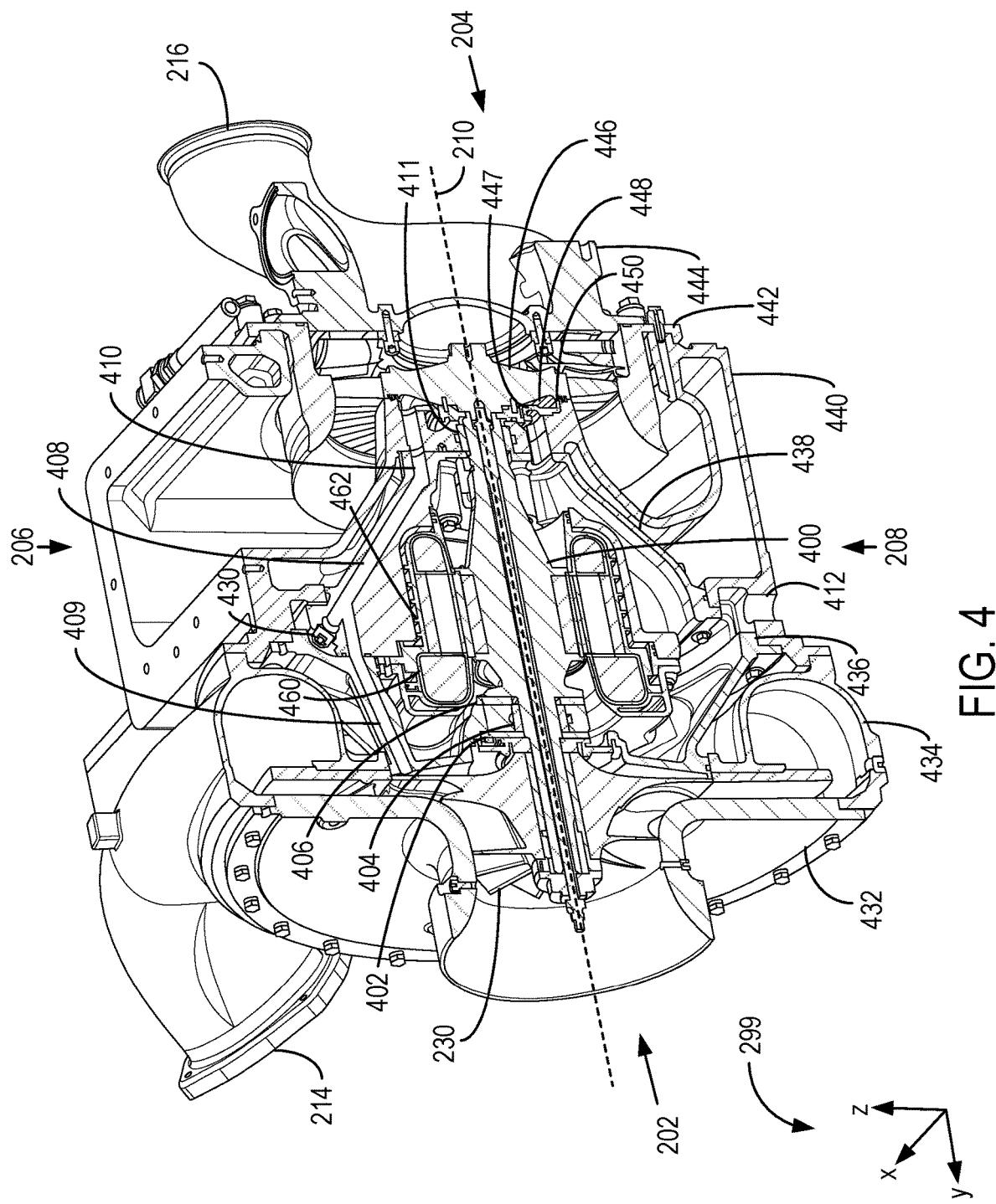
FIG. 4 shows a sectional perspective view of the electric turbocharger of FIGS. 2-3.

Referring to FIG. 4, a sectional perspective view of the electric turbocharger is shown. The view shown by FIG. 4 is taken along the central axis in the direction indicated by arrows 211 shown by FIG. 2. As shown, the shaft is arranged coaxially to the central axis and may rotate around the central axis. The shaft is maintained in position along the central axis by first journal bearing 404 and second journal bearing 411, with the first journal bearing coupled to, and supported by, compressor bearing carrier 436, and with the second journal bearing coupled to, and supported by, turbine outer housing 440.

The electric turbocharger includes an electric machine (e.g., alternator/generator) that may provide electrical power to one or more devices of the vehicle (e.g., similar to, or the same as, the electric machine described above with reference to FIG. 1). The electric machine may be electrically coupled to the junction box described above. The shaft is enclosed by (e.g., encircled by) a stator 460 of the electric machine and rotates around the central axis during conditions in which the turbine is driven by exhaust gases. The stator may be enclosed by a coolant jacket 462. The shaft is a rotor of the electric machine, and during conditions in which the shaft is driven (e.g., rotated) by the rotation of the turbine, the electric machine generates electrical power via electromechanical coupling between the shaft and the stator, where the electrical power may be provided to the one or more devices (e.g., provided to an electrical storage device such as a battery for storage, provided to one or more motors that may provide a motive force to wheels of the vehicle for driving of the vehicle, etc.).

The electric turbocharger includes intake inlet section 432 arranged at the compressor side. The electric turbocharger further includes compressor volute 434 coupled to each of the intake inlet section and the compressor bearing carrier. The turbine outer housing is coupled to each of the compressor bearing carrier, electric machine housing 438, and turbine inner housing 442. The turbine inner housing may be joined to the electric machine housing within an interior of the turbine outer housing (e.g., the turbine inner housing and electric machine housing may each be disposed within, e.g., housed by, the turbine outer housing). Turbine inlet section 444 is coupled to the turbine inner housing. The compressor wheel is enclosed by (e.g., surrounded by) the compressor volute and the turbine wheel is enclosed by the turbine inner housing. In some embodiments, the turbine outer housing, electric machine housing, and/or turbine inner housing may be integrated together as a single, monolithic unit (e.g., molded together, formed together via an additive manufacturing process, etc., without seams, fasteners, adhesives, etc.), where the buffer air passage and oil supply passage are each formed within the single, monolithic unit. As one example, the turbine outer housing, electric machine housing, and turbine inner housing may be formed together as a single unit via an additive manufacturing process (e.g., 3D printing), where the buffer air passage and oil supply passage are passages formed within the single unit via the additive manufacturing process.

Figure 6:
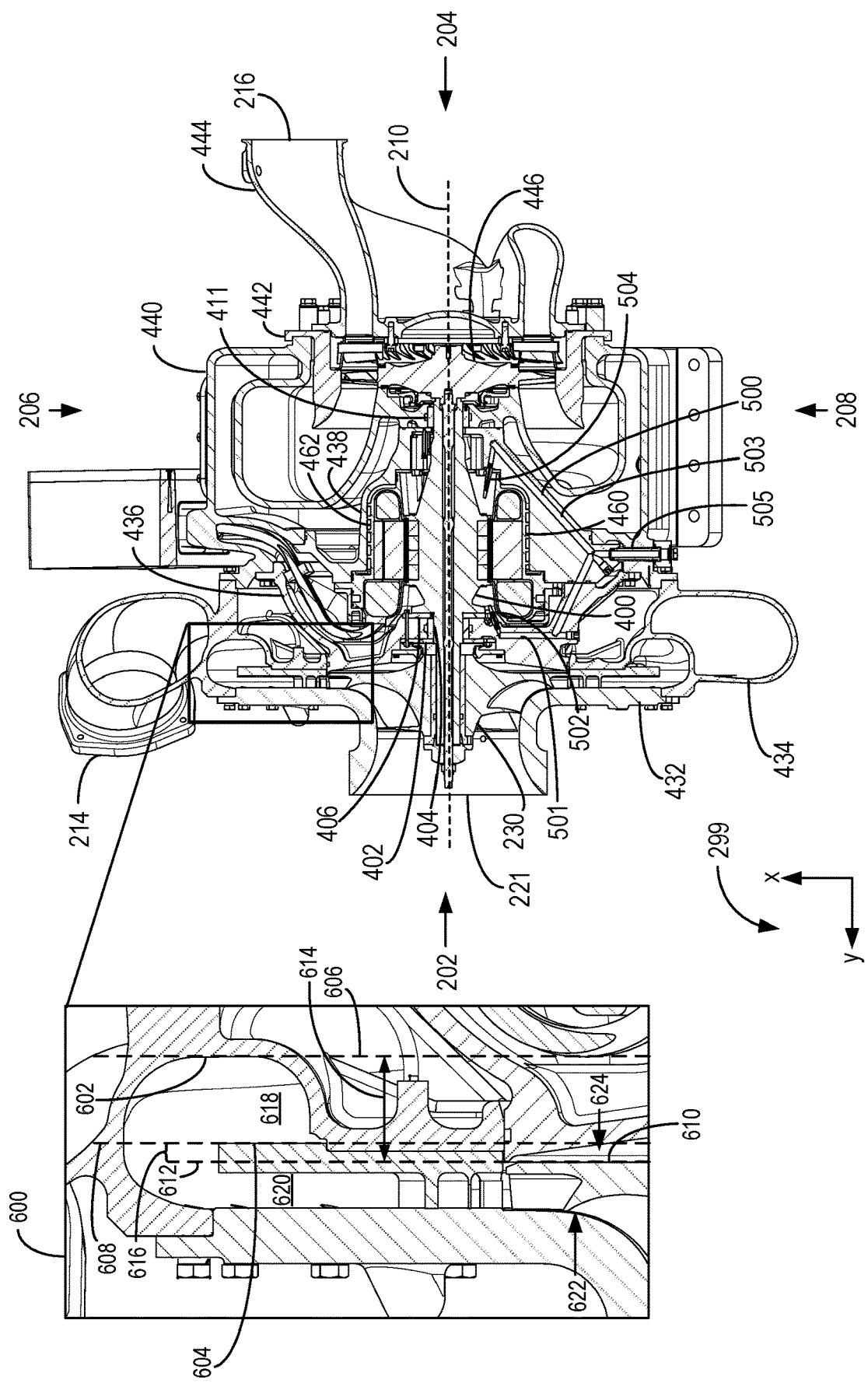
FIG. 6 shows a side sectional view of the electric turbocharger of FIGS. 2-5.

In some embodiments, the compressor volute may be arranged between the compressor wheel and the turbine outer housing in the axial direction of the electric turbocharger (e.g., the direction parallel with the central axis of the shaft of the electric turbocharger), toward the center of the electric turbocharger. Referring momentarily to FIG. 6, the compressor volute is shown by inset 600 including an inner wall 604 and an outer wall 602, where a length 616 between the inner wall and an end surface 610 of the compressor wheel is less than a length 614 between the outer wall and the end surface of the compressor wheel. First axis 612 is shown extending along the end surface of the compressor wheel, second axis 608 is shown extending along the inner wall of the compressor volute, and third axis 606 is shown extending along the outer wall of the compressor volute. The first axis, the second axis, and the third axis extend parallel to each other. The end surface of the compressor wheel is an approximately flat (e.g., planar) surface facing away from the intake air inlet of the compressor (e.g., with vanes, fins, etc. of the compressor wheel facing the intake air inlet at a first end 622 of the compressor wheel, and with the end surface arranged at an opposing, second end 624 of the compressor wheel, toward the turbine outer housing in the direction of the central axis of the electric turbocharger).

The compressor volute includes a clearance 618 formed between the inner wall and the outer wall, and a channel 620 joining intake air inlet of the compressor to the clearance within the compressor volute. In this configuration, the inner wall of the volute is arranged between the end surface of the compressor wheel and the outer wall of the compressor volute in the direction parallel with the central axis of the electric turbocharger, with the inner wall arranged closer to the intake air inlet and further from the turbine outer housing, and with the outer wall arranged further from the intake air inlet and closer to the turbine outer housing. By configuring the outer wall of the compressor volute to be between the inner wall of the volute and the turbine outer housing and configuring the inner wall of the compressor volute to be between the end surface of the compressor wheel and the outer wall of the compressor volute clearance, the increased packaging space for the rotor and stator of the electric machine of the electric turbocharger is provided while maintaining the position of the flanges joining the compressor volute to the turbine outer housing. In particular, the flanges of the compressor volute may be maintained in a same position as they may be in configurations in which the outer wall of the compressor volute is between the inner wall and the turbine outer housing (e.g., configurations in which the inner wall of the compressor volute is arranged between the outer wall and the outer turbine housing). As a result, the overall space occupied by the electric turbocharger may be the same as, or less than, other configurations while providing additional packaging space for the stator and rotor of the electric machine. This space or volume management may increase an ease of maintenance, compactness, etc. of the electric turbocharger.

Again referring to FIG. 4, the electric turbocharger may include a first thrust bearing 402 and a second thrust bearing 406 arranged toward the compressor side that may maintain the position of the shaft along the central axis. In particular, the first thrust bearing and second thrust bearing may maintain the position of the shaft such that the shaft does not move along the central axis toward the compressor side or toward the turbine side. Further during operation of the turbocharger, thrust loads may be applied to the shaft. The first thrust bearing and second thrust bearing may counteract at least a portion of the thrust loads at the compressor side (e.g., provide resistance against the thrust loads).

Figure 12:
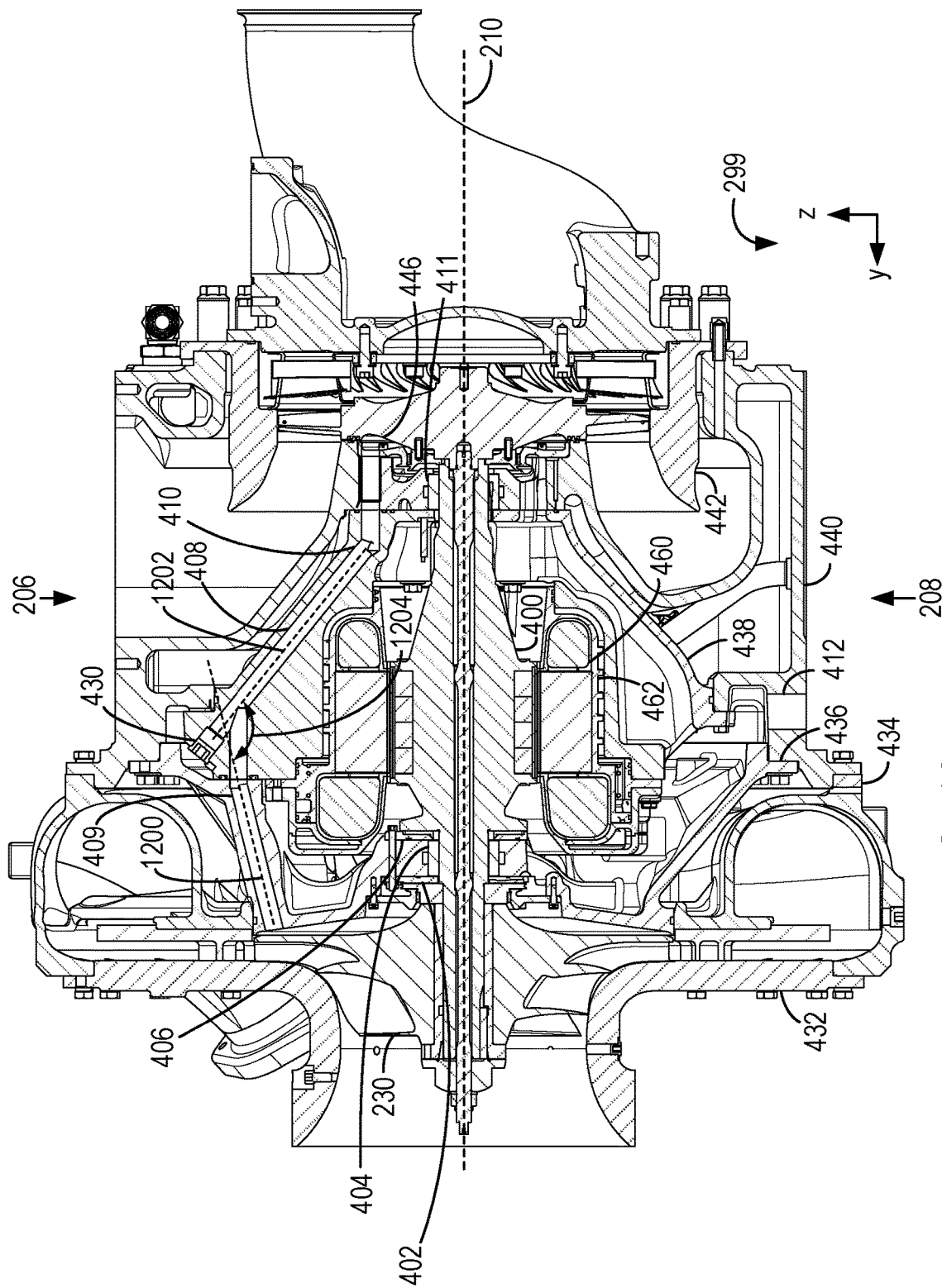
FIG. 12 shows a side sectional view of a buffer air passage of the electric turbocharger of FIGS. 2-11.

The electric turbocharger further includes a buffer air passage 408 that may provide air compressed by the compressor wheel to a chamber 448 arranged between the turbine wheel and the turbine outer housing. The compressed air may pressurize the chamber and may provide a balancing force to the turbine wheel and/or shaft that may cancel at least a portion of the thrust loads described above. In particular, the thrust loads may act against the components of the turbocharger in a direction toward the compressor side, and the balancing force may act against the components in the opposing direction (e.g., toward the turbine side). The turbine wheel may include a labyrinth 450 that may reduce or eliminate a flow of the compressed air from the chamber. The buffer air passage includes a first passage section 409 formed within the compressor bearing carrier and a second passage section 410 formed within the electric machine housing. In some embodiments, the first passage section and the second passage section may be formed by drilling. In other embodiments, the first passage section and the second passage section may be formed by molding, an additive manufacturing process (e.g., 3D printing), etc. The first passage section fluidly couples to the second passage section (e.g., compressed air may flow from the first passage section to the second passage section). In some embodiments, as shown by FIG. 12, the first passage section and the second passage section are angled relative to each other by angle 1204 (where the angle is shown between axis 1200 parallel with the first passage section and axis 1202 parallel with the second passage section). By angling the first passage section and the second passage section relative to each other, an amount of space available for seating the electric machine within the electric turbocharger may be increased, which may increase an ease of manufacturing and/or ease of maintenance of the electric turbocharger. The buffer air passage may be sealed toward the upper end of the electric turbocharger by a plug 430. The second passage section of the buffer air passage opens directly to the chamber (e.g., the second passage section terminates in an opening fluidly coupling the second passage section with the chamber). While the chamber is pressurized (e.g., the chamber is provided air pressurized by the compressor wheel via the buffer air passage), a seal plate 447 defining a wall of the chamber is biased toward the turbine wheel. The buffer air passage and/or the oil supply passage may be referred to herein as a fluid passage.

Figure 5:
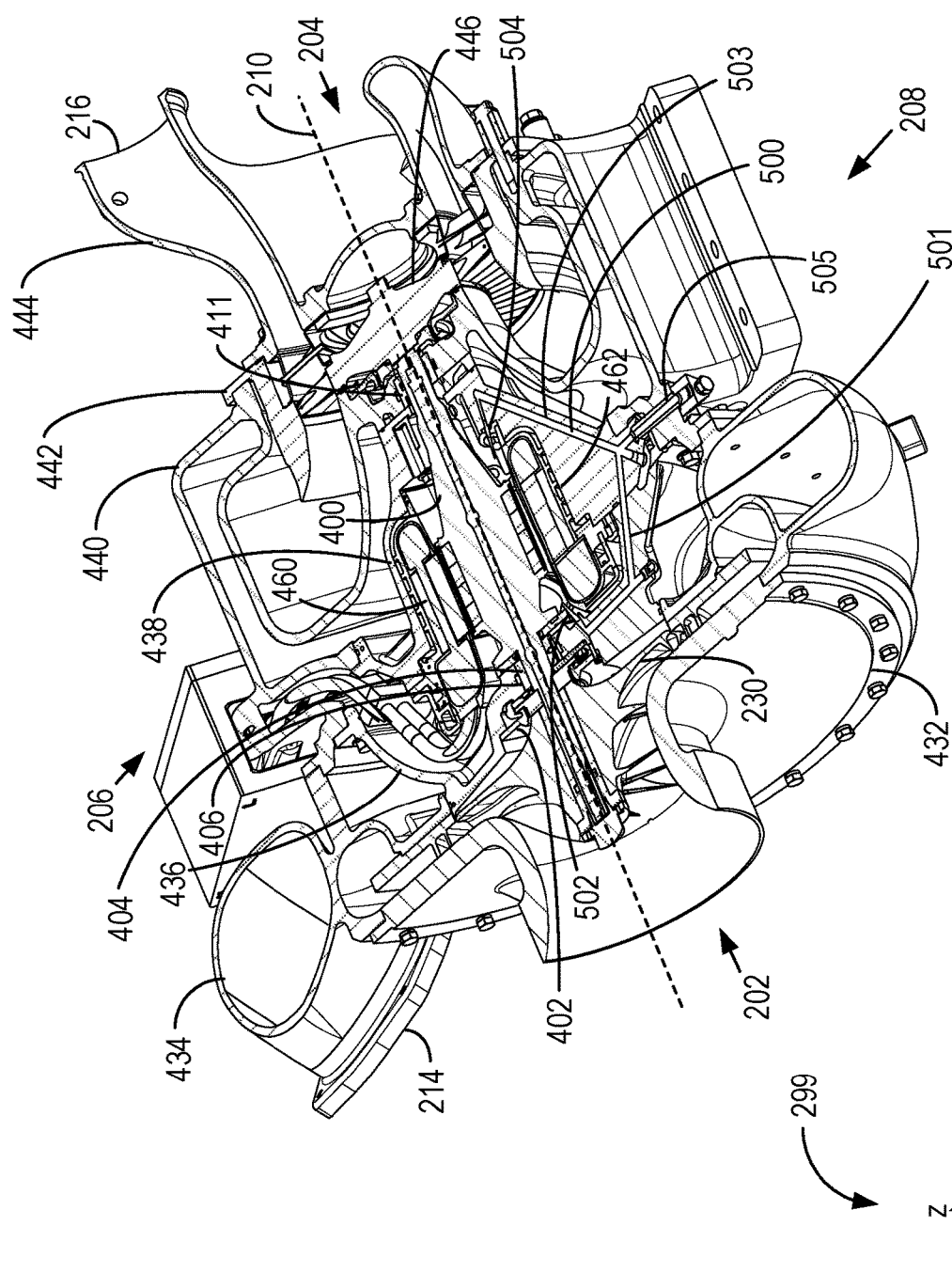
FIG. 5 shows another sectional perspective view of the electric turbocharger of FIGS. 2-4.

Referring collectively to FIGS. 5-6, additional sectional views of the electric turbocharger are shown. In particular, FIG. 5 shows a perspective view of the electric turbocharger and FIG. 6 shows an end view of the electric turbocharger, with the views shown by FIGS. 5-6 taken along the central axis in the direction indicated by arrows 213 shown by FIG. 2. The electric turbocharger includes an oil supply passage 500 formed in the compressor bearing carrier and the turbine outer housing. The oil supply passage includes a first oil passage section 501 formed in the compressor bearing carrier, a second oil passage section 503 formed in the electric machine housing, and an oil passage inlet section 505 formed in the turbine outer housing, with the first oil passage section, second oil passage section, and oil passage inlet section fluidly coupled to each other such that oil may flow through the oil passage inlet section to each of the first oil passage section and the second oil passage section. In some embodiments, the oil passage inlet section may be fluidly coupled to a pressurized lube oil feed of the engine (which may be referred to as a pressurized engine lube oil feed), with the pressurized oil flowing into the oil passage inlet section.

The first oil passage section is fluidly coupled to a first oil nozzle 502 and the second oil passage section is fluidly coupled to a second oil nozzle 504. The first oil nozzle joins directly to the oil supply passage at the first oil passage section (e.g., a portion of the first oil nozzle may be seated within the first oil passage section) and may be encircled by the compressor bearing carrier. The first oil nozzle may squirt or spray oil provided by the first oil passage section toward surfaces of the shaft, and the second oil nozzle may spray oil provided by the second oil passage section toward surfaces of the shaft. The oil sprayed by the first oil nozzle and the second oil nozzle may provide cooling and lubrication of the shaft and other components of the electric turbocharger, as described further below. As shown by FIG. 5, the first oil passage section and the second oil passage section are angled relative to each other by second angle 720 (where the angle is shown extending between axis 716 parallel with the first oil passage section and axis 718 parallel with the second oil passage section). By angling the first oil passage section and the second oil passage section relative to each other, an amount of space available for seating the electric machine within the electric turbocharger may be increased, which may increase an ease of manufacturing and/or ease of maintenance of the electric turbocharger. In some embodiments the oil supply passage and the buffer air passage may be arranged along a same plane (e.g., a plane may intersect each of the oil supply passage and the buffer air passage, where the plane extends parallel with the central axis of the electric turbocharger).

Figure 7:
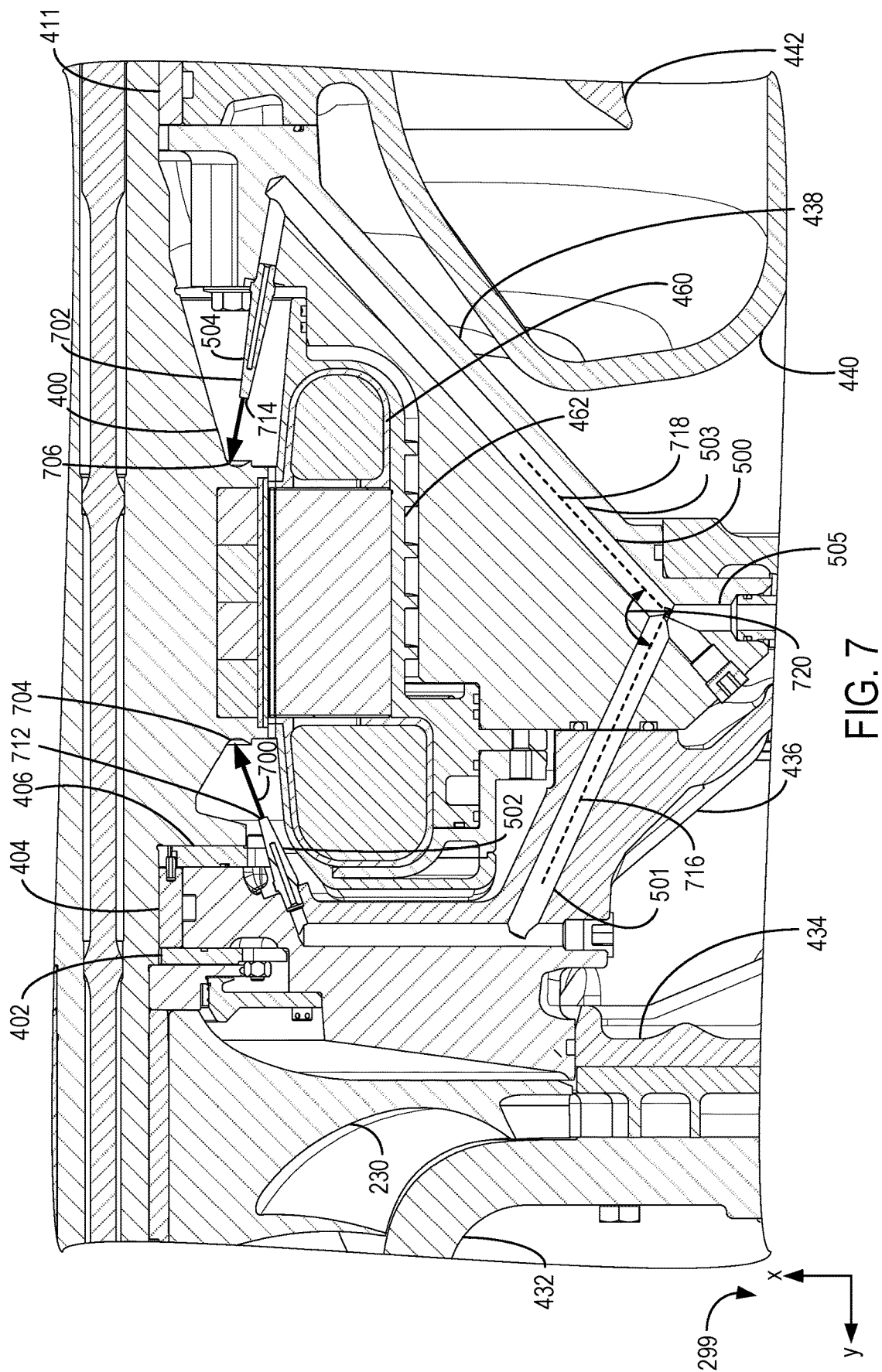
FIG. 7 shows an enlarged side sectional view of an oil supply passage of the electric turbocharger of FIGS. 2-6.
Figure 8:
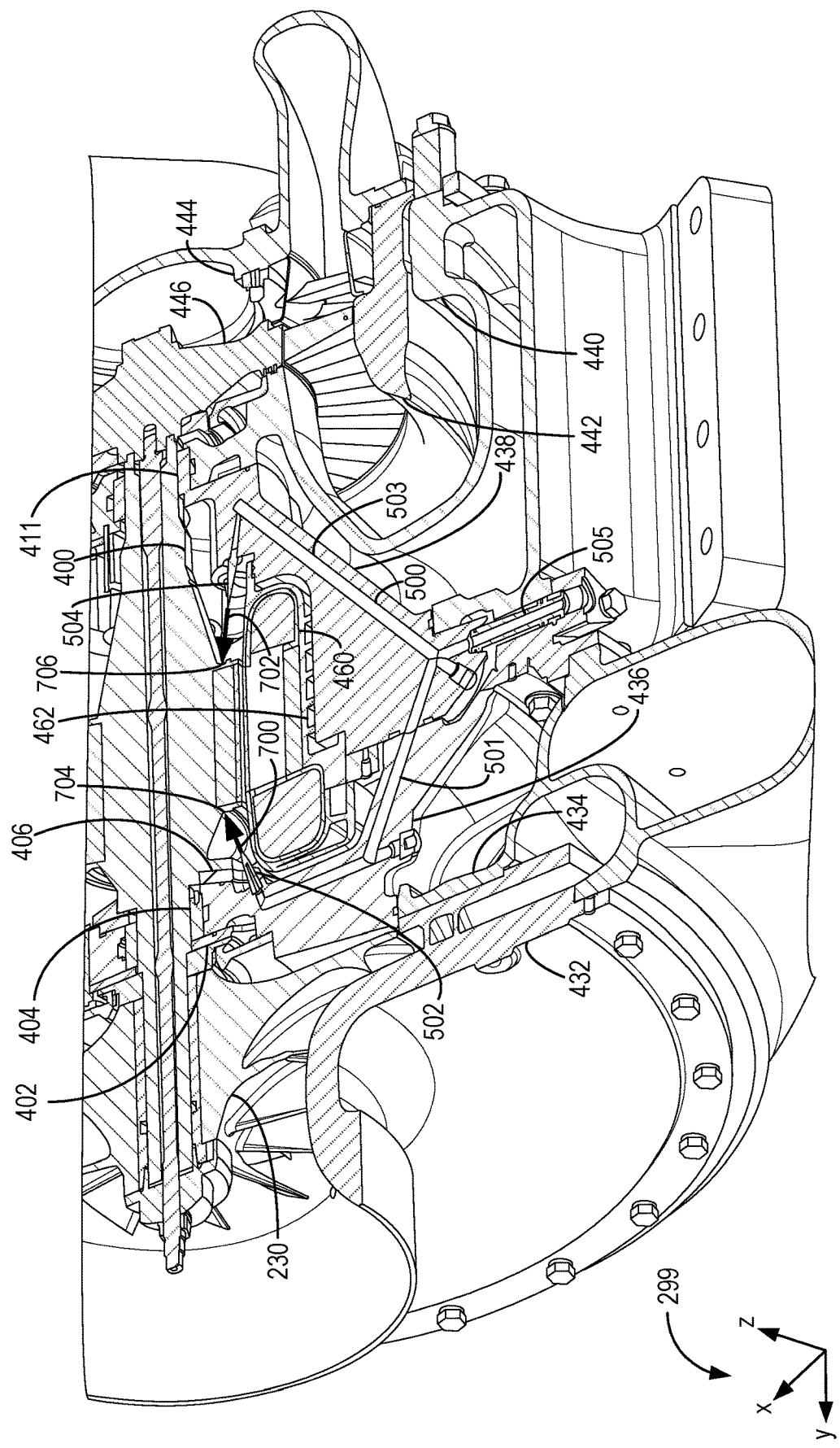
FIG. 8 shows an enlarged perspective sectional view of the oil supply passage of the electric turbocharger of FIGS. 2-7.

Referring collectively to FIGS. 7-8, enlarged sectional views of the electric turbocharger are shown. The view shown by FIG. 7 is in the same direction as the view shown by FIG. 6, and FIG. 8 shows an enlarged sectional perspective view of the electric turbocharger.

The first oil nozzle is oriented toward a first surface 704 of the shaft, and the second oil nozzle is oriented toward a second surface 706 of the shaft, where the first surface is offset (e.g., spaced apart) from the second surface in the direction of the central axis. In particular, a distance between the first surface and the compressor side is less than a distance between the second surface and the compressor side. A tip 712 of the first oil nozzle faces a tip 714 of the second oil nozzle. During conditions in which oil is provided to the first oil nozzle via the first oil passage section, the first oil nozzle may spray oil (e.g., oil jets) toward the first surface as indicated by arrow 700. During conditions in which oil is provided to the second oil nozzle via the second oil passage section, the second oil nozzle may spray oil toward the second surface as indicated by arrow 702. The oil spray may cool and/or lubricate the components of the electric turbocharger. For example, during operation of the electric turbocharger, the rotation of the shaft may result in generation of electrical power via electromechanical coupling between the shaft and the stator as described above. However, the generation of electrical power may increase a temperature of the shaft and/or other components. The first oil nozzle and the second oil nozzle may spray oil toward the shaft, reducing the temperature of the shaft and increasing a durability of the shaft and/or other components.

Figure 9:
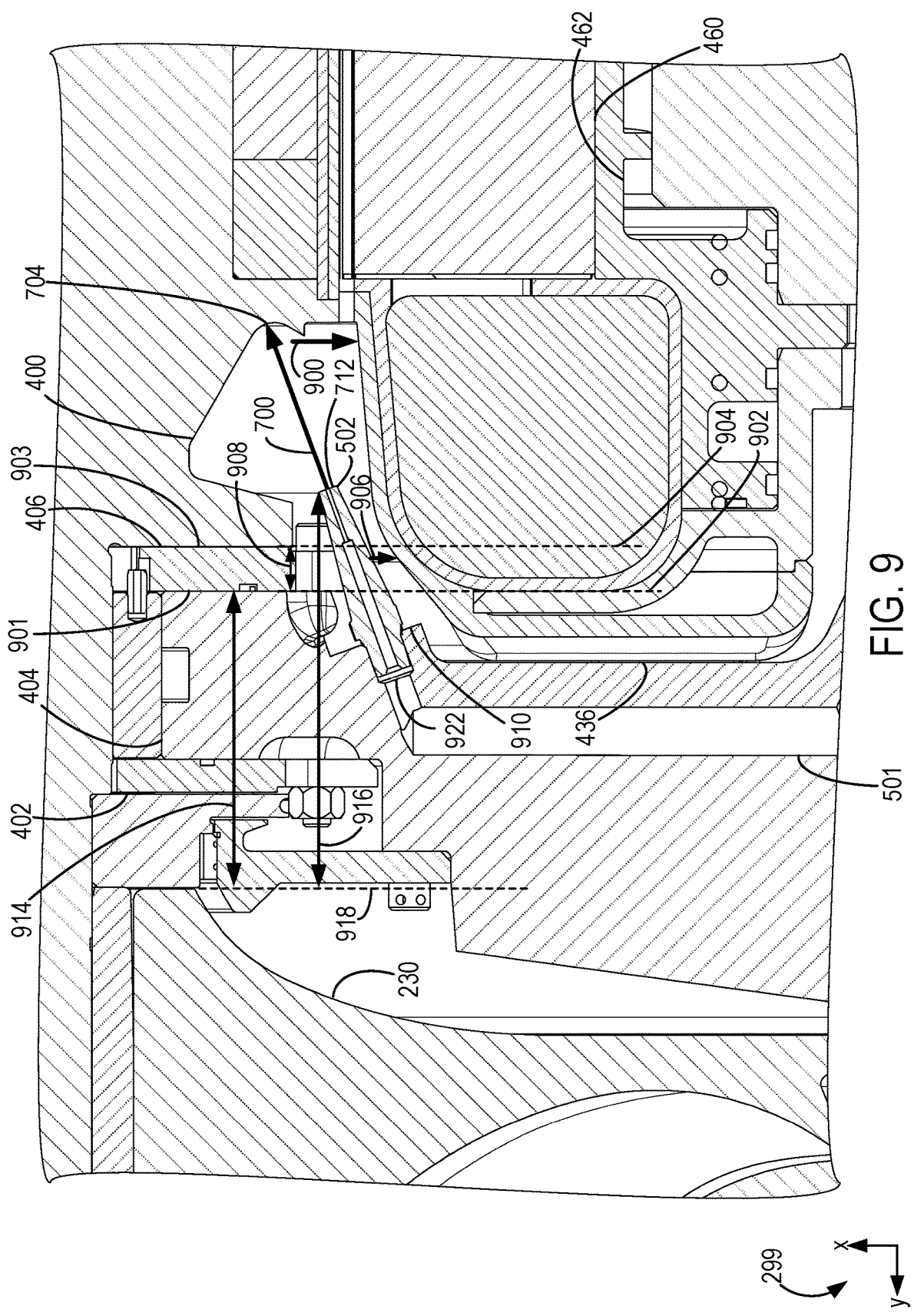
FIG. 9 shows an enlarged side sectional view of a first oil nozzle of the electric turbocharger of FIGS. 2-8.
Figure 10:
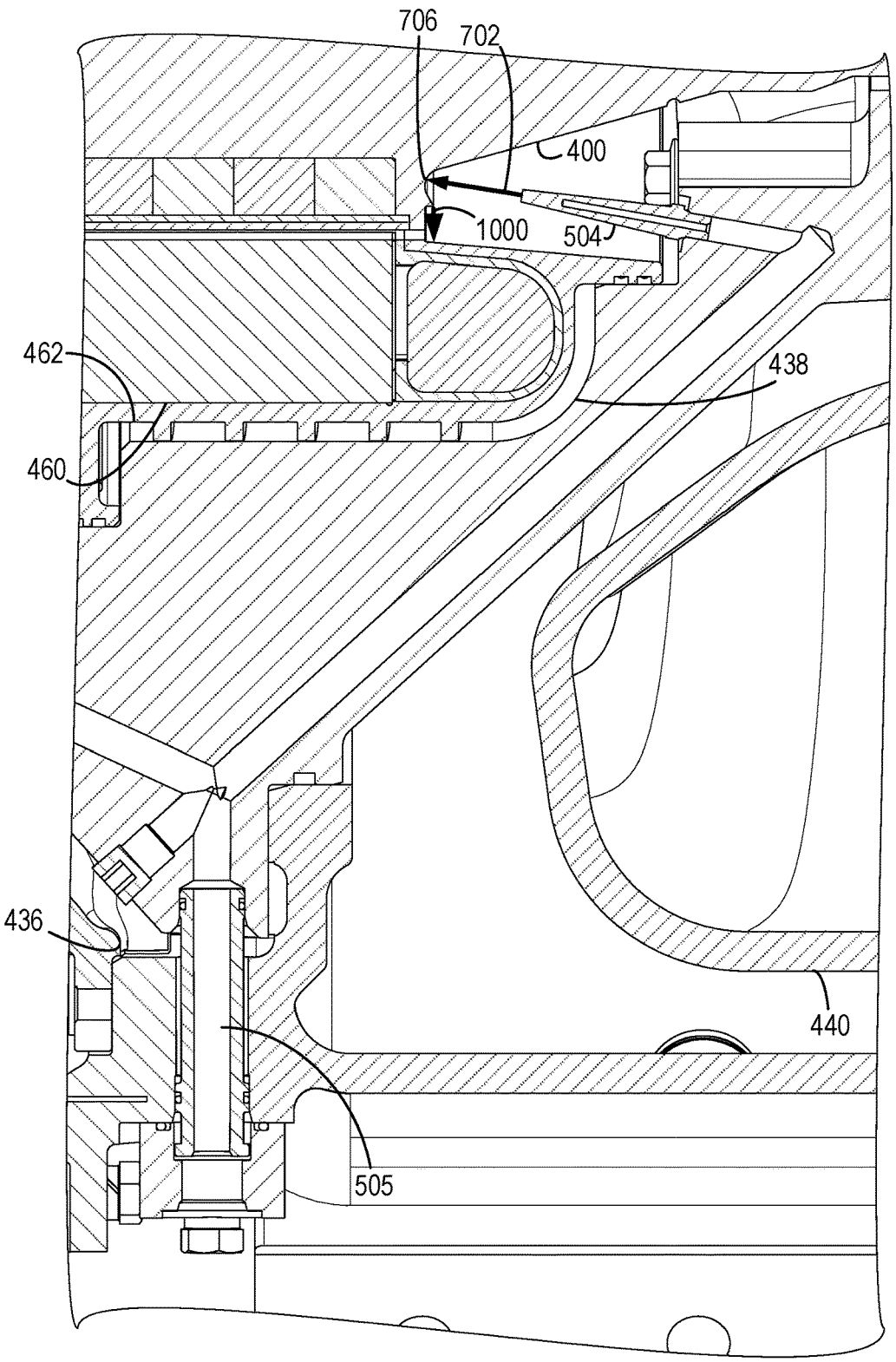
FIG. 10 shows an enlarged side sectional view of a second oil nozzle of the electric turbocharger of FIGS. 2-9.
Figure 11:
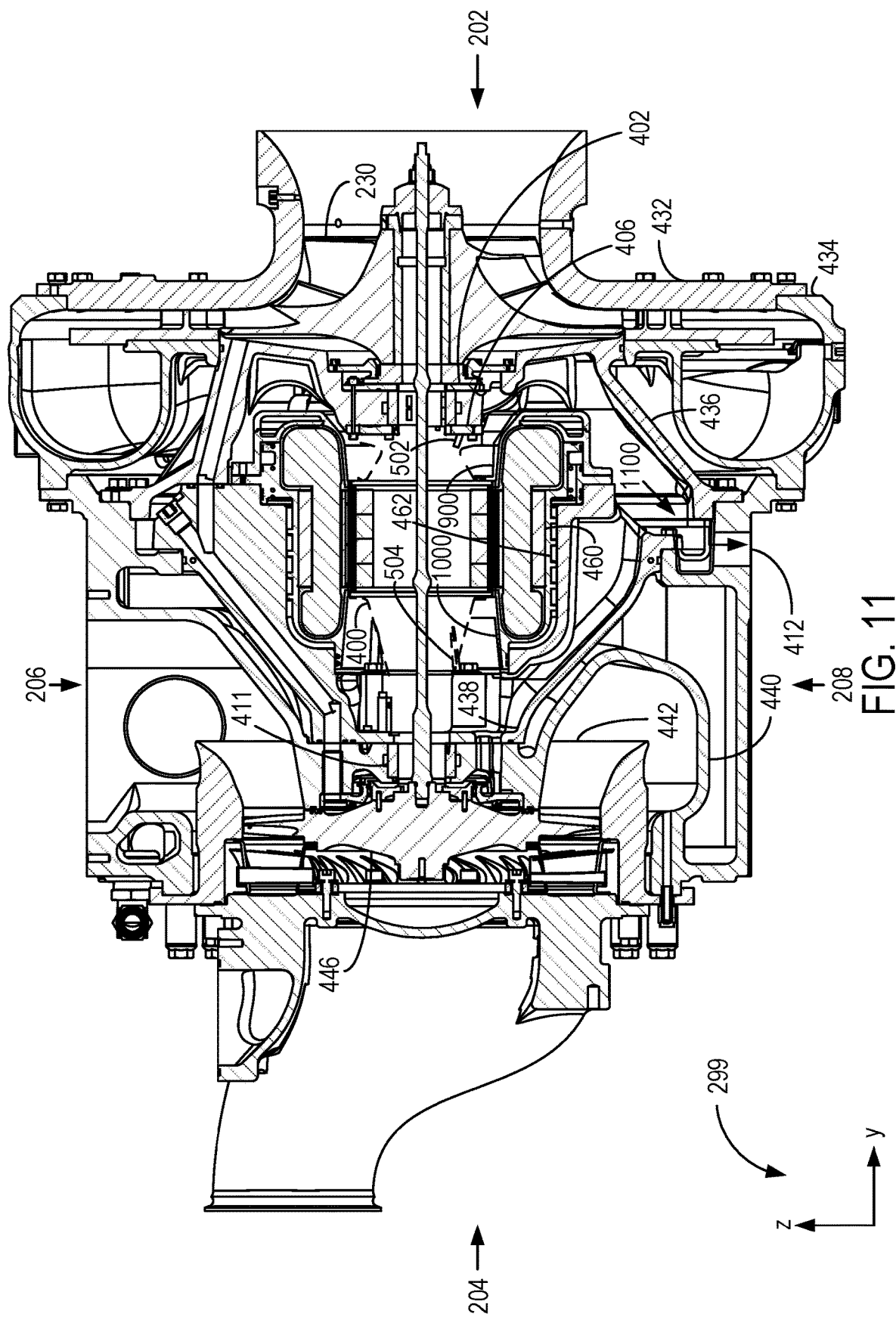
FIG. 11 shows an enlarged perspective sectional view of the oil supply passage, the first oil nozzle, and the second oil nozzle of the electric turbocharger of FIGS. 2-10.

Referring to FIGS. 9-10, enlarged views of the oil nozzles are shown. Specifically, FIG. 9 shows an enlarged view of the first oil nozzle and FIG. 10 shows an enlarged view of the second oil nozzle. Oil sprayed by the first oil nozzle may come into contact with the surfaces of the shaft (e.g., the first surface described above). The oil may then flow toward the lower end of the electric turbocharger via gravity, as indicated by arrow 900 shown by FIG. 9. Similarly, oil sprayed by the second oil nozzle may come into contact with the surfaces of the shaft, such as the second surface described above, and may then flow toward the lower end of the electric turbocharger via gravity as indicated by arrow 1000 shown by FIG. 10. The oil flow due to gravity indicated by the arrows in FIGS. 9-10 may flow across surfaces of other components of the electric turbocharger as shown by FIG. 11. The oil sprayed by the first oil nozzle and the oil sprayed by the second oil nozzle may mix and/or converge as indicated by arrow 1100 shown by FIG. 11, and the mixed oil may drain to drain opening 412 (shown by FIGS. 4 and 11-12) at the lower end of the turbocharger. The shaft of the electric turbocharger is shown partially transparent in the view of FIG. 11 and is indicated by dashed lines, with the first oil nozzle and the second oil nozzle arranged behind the shaft in the view shown by FIG. 11.

The thrust bearings may receive oil (e.g., cooling oil and/or bearing lube oil) via the pressurized lube oil feed of the engine (which may be referred to herein as an oil source). In some embodiments, the thrust bearings may receive cooling oil and bearing lube oil separately (e.g., via separate passages) from the pressurized lube oil feed. The oil may be provided to the electric turbocharger via a hose and/or port, in some embodiments. During operation of the electric turbocharger, the oil provided to the thrust bearings may be propelled by the rotation of the shaft and the thrust bearings. The oil provided to the second thrust bearing may be propelled in an outward direction from the second thrust bearing as shown by arrow 906 (shown by FIG. 9) indicating a direction of the oil propelled by the second thrust bearing. The propelled oil may form an oil curtain (e.g., a continuous or approximately continuous spray of oil propelled by the second thrust bearing in a direction away from the second thrust bearing, along a plane parallel to a first end surface 901 and a second end surface 903 of the second thrust bearing). For example, first axis 902 and second axis 904 are shown arranged parallel to each other, with the first axis aligned to a first end of the second thrust bearing (e.g., the first end surface) and with the second axis aligned to an opposing, second end of the second thrust bearing (e.g., the second end surface).

Oil propelled by the second thrust bearing may travel from the second thrust bearing through the region between the first axis and the second axis (e.g., with the width of the region indicated by arrow 908) and toward the lower end of the electric turbocharger. However, the first oil nozzle reduces or eliminates an interference between the oil propelled by the second thrust bearing and the oil sprayed by the first oil nozzle. In particular, the first oil nozzle extends outward from a wall 910 of the compressor bearing carrier through the region between the first axis and the second axis. A distance between the second axis and the portion of the first oil nozzle at the wall of the compressor bearing carrier is greater than a distance between the first axis and the portion of the first oil nozzle at the wall of the compressor bearing carrier (e.g., the portion of the first oil nozzle at the wall of the compressor bearing carrier is to the left of each of the first axis and the second axis in the view shown by FIG. 9). However, a distance between the second axis and the tip of the first oil nozzle is less than a distance between the first axis and the tip (e.g., the tip is to the right of the first axis and the second axis in the view shown by FIG. 9). The tip is arranged outside of the region between the first axis and the second axis (e.g., the region of the oil curtain propelled by the second thrust bearing) such that oil sprayed by the tip of the first oil nozzle does not come into contact with oil propelled by the second thrust bearing prior to the oil sprayed by the tip of the first oil nozzle coming into contact with the surfaces of the shaft. As shown by FIG. 9, a length 914 between the second thrust bearing and the compressor wheel in an axial direction of the electric turbocharger (e.g., a direction parallel with the longitudinal axis) is smaller than a length 916 between the tip of the first oil nozzle and the compressor wheel in the axial direction, where axis 918 is aligned with the compressor wheel and perpendicular to the longitudinal axis. As a result, oil propelled by the second thrust bearing does not interfere with the oil sprayed by the first oil nozzle (e.g., oil propelled by the second thrust bearing does not come into contact with the spray of oil generated by the first oil nozzle and does not alter the direction of the spray of oil from the first oil nozzle), which may increase the amount of oil sprayed by the first oil nozzle coming into contact with the surfaces of the shaft and may increase the cooling of the shaft.

In some embodiments, the first oil nozzle and/or second oil nozzle may have a substantially conical shape. For example, a width of the tip of the first oil nozzle may be narrower than a width of an opposing end 922 (shown by FIG. 9) of the first oil nozzle joined to (e.g., seated within) the first oil passage section. However, in other embodiments, the first oil nozzle and/or the second oil nozzle may have a different shape. In some embodiments, the first oil nozzle and/or the second oil nozzle may include multiple tips, where each tip may generate a spray of oil. For example, the first oil nozzle may include two tips, three tips, etc., where at least one of the tips is arranged outside of the region between the first axis and the second axis (e.g., the region of the oil curtain propelled by the second thrust bearing) and oil sprayed by the at least one tip is directed toward the surfaces of the shaft and does not come into contact with oil propelled by the second thrust bearing prior to coming into direct contact with the surfaces of the shaft. The first oil nozzle and the second oil nozzle may each have a different shape, in some embodiments. In some embodiments, the electric turbocharger may include additional nozzles spray oil toward the shaft (e.g., nozzles in addition to the first oil nozzle and the second oil nozzle).

Referring to FIG. 11, a sectional view of the oil supply passage, the first oil nozzle, and the second oil nozzle is shown. The oil sprayed by the first oil nozzle that comes into contact with the surfaces of the shaft is shown mixing and/or converging with oil sprayed by the second oil nozzle coming into contact with the surfaces of shaft. In particular, oil sprayed by the first oil nozzle against the shaft and oil sprayed by the second oil nozzle against the shaft may flow from the shaft toward the lower end of the electric turbocharger and may mix and/or converge as the oil from each portion of the shaft drains toward the lower end.

Referring to FIG. 12, an additional sectional view of the electric turbocharger is shown. As described above, the buffer air passage may provide air compressed by the compressor wheel to the chamber arranged between the turbine wheel and the turbine outer housing. The buffer air passage is shown arranged toward the upper end of the electric turbocharger, across the central axis from the drain opening that may receive oil draining from the shaft as described above. The stator and the coolant jacket are each partially enclosed by each of the compressor bearing carrier and the electric machine housing, with the first passage section formed within the compressor bearing carrier and the second passage section formed within the electric machine housing as described above.

Figure 13:
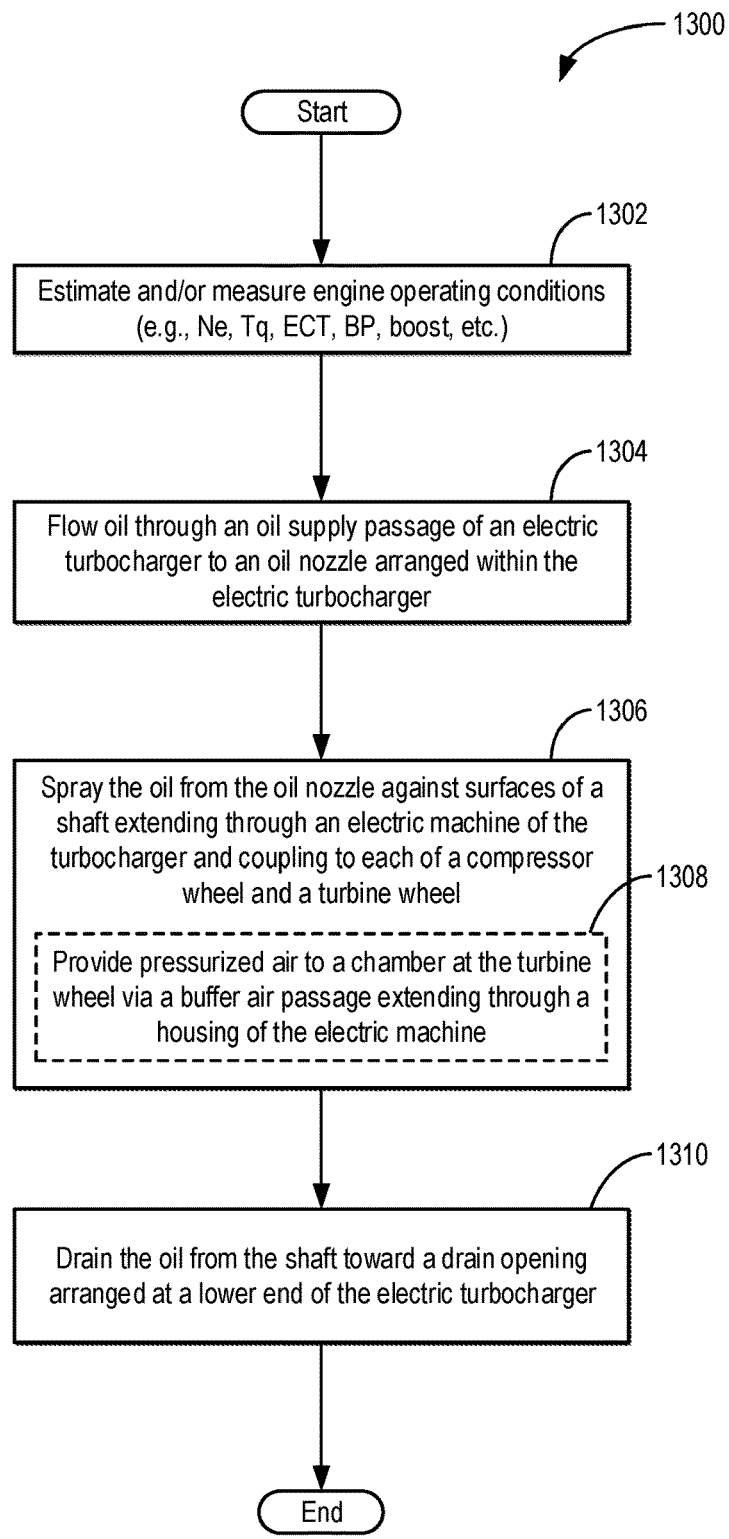
FIG. 13 shows a flow chart of a method for controlling an electric turbocharger.

Referring to FIG. 13, a flow chart illustrating a method 1300 for controlling an electric turbocharger is shown. Controlling the electric turbocharger includes controlling a flow of oil and pressurized air through the electric turbocharger. The electric turbocharger may be similar to, or the same as, the electric turbochargers described above with reference to FIGS. 1-12. The components described with reference to the method illustrated by FIG. 13 may be similar to those described above with reference to FIGS. 1-12. Instructions for carrying out the method and the rest of the methods included herein may be executed by a controller, such as the controller described above with reference to FIG. 1, based on instructions stored on a memory of the controller and in conjunction with signals received from sensors of the engine system, such as the sensors described above with reference to FIG. 1. The controller may employ or initiate actuators to adjust operation, according to the methods described below.

The method at step 1302 includes estimating and/or measuring engine operating conditions (e.g., Ne, Tq, ECT, BP, boost, etc.). The engine may be similar to, or the same as, the engine described above with reference to FIG. 1. Estimating and/or measuring the engine operating conditions may include estimating and/or measuring an oil temperature of oil within the electric turbocharger, a mass flow rate of exhaust gas to a turbine of the electric turbocharger, a mass flow rate of compressed air from a compressor of the electric turbocharger, an electrical voltage and/or current generated by an electric machine of the electric turbocharger, etc. The electric machine may be similar to, or the same as, the electric machine described above with reference to FIG. 1 and/or the electric machine of the electric turbocharger shown by FIGS. 2-12.

The method continues to step 1304 where oil flows through an oil supply passage of the electric turbocharger to an oil nozzle arranged within the electric turbocharger. The oil supply passage and the oil nozzle may be similar to, or the same as, the oil supply passage and the oil nozzle, respectively, described above with reference to the electric turbocharger shown by FIGS. 2-12. The oil supply passage may be formed in a compressor bearing carrier and a turbine outer housing of the electric turbocharger, such as the compressor bearing carrier and turbine outer housing, respectively, of the electric turbocharger described above with reference to FIGS. 2-12. Oil may be provided to the oil supply passage by the pressurized lube oil feed of the engine.

The method continues to step 1306 where the method includes spraying the oil from the oil nozzle against surfaces of a shaft extending through the electric machine of the turbocharger and coupling to each of a compressor wheel and a turbine wheel. The shaft, compressor wheel, and turbine wheel may be similar to, or the same as, the shaft, compressor wheel, and turbine wheel, respectively, described above with reference to the electric turbocharger shown by FIGS. 2-12. The shaft is a rotor of the electric machine and interacts electromechanically with a stator of the electric machine to generate electric energy. The compressor wheel is coupled to the shaft at a first end and the turbine wheel is coupled to the shaft at an opposing, second end, with the stator arranged between the turbine wheel and the compressor wheel in the direction of a rotational axis of the shaft. Oil sprayed by the oil nozzle may come into contact with the surfaces of the shaft and may cool the shaft. The oil nozzle is arranged such that oil propelled from the shaft and/or thrust bearings of the shaft due to rotation of the shaft does not interfere with the oil spray from the oil nozzle (e.g., the oil spray travels toward the shaft without interference from oil propelled from the shaft and/or bearings due to rotation of the shaft).

The method may include, at step 1308, providing pressurized air to a chamber at the turbine wheel via a buffer air passage extending through a housing of the electric machine. The pressurized air may be pressurized by the compressor wheel and may flow through the buffer air passage to the chamber, where the chamber is arranged between the turbine wheel and the turbine outer housing. The buffer air passage, electric machine housing, and chamber may be similar to, or the same as, the buffer air passage, electric machine housing, and chamber, respectively, described above with reference to the electric turbocharger shown by FIGS. 2-12. The compressed air may pressurize the chamber and may provide a balancing force to the turbine wheel and/or shaft that may cancel at least a portion of thrust loads against the shaft and turbine wheel.

The method continues to step 1310 where the method includes draining the oil from the shaft toward a drain opening arranged at a lower end of the electric turbocharger. The drain opening and lower end may be similar to, or the same as, the drain opening and lower end, respectively, described above with reference to the electric turbocharger shown by FIGS. 2-12. The oil sprayed by the oil nozzle against the shaft may drain via gravity toward the drain opening. As the oil drains toward the drain opening, the oil may flow against surfaces of components of the electric turbocharger (e.g., a coolant jacket housing, such as the coolant jacket housing of the electric turbocharger described above with reference to FIGS. 2-12) and may cool the components. FIGS. 2-12 are shown approximately to scale, although other relative dimensions may be used, if desired.

FIGS. 2-12 show relative positioning of the various components. If shown directly contacting each other, or directly coupled, then such elements may be referred to as directly contacting or directly coupled, respectively, at least in one embodiment. Similarly, elements shown contiguous or adjacent to one another may be contiguous or adjacent to each other, respectively, at least in one embodiment. As an example, components laying in face-sharing contact with each other may be referred to as in face-sharing contact. As another example, elements positioned apart from each other with only a space there-between and no other components may be referred to as such, in at least one embodiment. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one embodiment. As used herein, top/bottom, upper/lower, above/below, may be relative to a vertical axis of the figures and used to describe positioning of elements of the figures relative to one another. As such, elements shown above other elements are positioned vertically above the other elements, in one embodiment. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one embodiment. Further still, an element shown within another element or shown outside of another element may be referred as such, in one embodiment. As used herein, the term "approximately" means about plus or minus five percent of the range unless otherwise specified.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the determined action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

The disclosure may provide support for a turbocharger system that includes a shaft coupling a compressor wheel to a turbine wheel, an electric machine including a stator encircling the shaft between the compressor wheel and the turbine wheel, and an oil supply passage formed in a housing of the electric machine and fluidly coupled to a first oil nozzle oriented toward the shaft. In a first example of the system, the system includes a buffer air passage formed in the housing of the electric machine and extending between the compressor wheel and a chamber at the turbine wheel. In a second example of the system, optionally including the first example, the system includes a compressor bearing carrier supporting a thrust bearing, and wherein the buffer air passage includes a first passage section formed in the compressor bearing carrier and a second passage section formed in the housing of the electric machine. In a third example of the system, optionally including one or both of the first and second examples, the second passage section opens directly to the chamber. In a fourth example of the system, optionally including one or more or each of the first through third examples, while the chamber is pressurized, a seal plate defining a wall of the chamber is biased toward the turbine wheel. In a fifth example of the system, optionally including one or more or each of the first through fourth examples, the system may include a thrust bearing coupled to the shaft, wherein the shaft is a rotor of the electric machine, with a length between the thrust bearing and the compressor wheel being smaller than a length between a tip of the first oil nozzle and the compressor wheel. In a sixth example of the system, optionally including one or more or each of the first through fifth examples, the system may include a compressor bearing carrier supporting a thrust bearing, and wherein the oil supply passage includes a first oil passage section formed in the compressor bearing carrier and a second oil passage section formed in the housing of the electric machine. In a seventh example of the system, optionally including one or more or each of the first through sixth examples, the first oil nozzle joins directly to the oil supply passage at the first oil passage section. In an eighth example of the system, optionally including one or more of each of the first through seventh examples, the system may include a second oil nozzle oriented toward the shaft, opposite to the first oil nozzle, with a tip of the first oil nozzle facing a tip of the second oil nozzle. In a ninth example of the system, optionally including one or more of each of the first through eighth examples, the second oil nozzle joins directly to the oil supply passage at the second oil passage section, and wherein the oil supply passage fluidly couples to a pressurized engine lube oil feed.

The disclosure provides support for a system that may include a turbocharger including a compressor, a turbine, and a compressor bearing carrier, an electric machine within the turbocharger including a housing and a rotor extending through each of the housing and the compressor bearing carrier, and a fluid passage formed through each of the housing and the compressor bearing carrier. In a first example of the system, the fluid passage is a buffer air passage fluidly coupling the compressor to a chamber at the turbine. In a second example of the system, optionally including the first example, the fluid passage is an oil supply passage fluidly coupling a nozzle encircled by the compressor bearing carrier to an oil source. In a third example of the system, optionally including one or both of the first and second examples, the fluid passage may define a first passage section formed in the housing and a second passage section formed in the compressor bearing carrier. In a fourth example of the system, optionally including one or more or each of the first through third examples, the first passage section extends at a first angle and the second passage section extends at a different, second angle. In a fifth example of the system, optionally including one or more or each of the first through fourth examples, the rotor couples a compressor wheel of the compressor to a turbine wheel of the turbine.

The disclosure provides a method that may include flowing oil through an oil supply passage of an electric turbocharger to an oil nozzle arranged within the electric turbocharger. In a first example of the method, the method may include spraying the oil from the oil nozzle against surfaces of a shaft extending through an electric machine of the electric turbocharger and coupling to each of a compressor wheel and a turbine wheel. In a second example of the method, optionally including the first example, the method may include providing pressurized air to a chamber at the turbine wheel via a buffer air passage extending through a housing of the electric machine. In a third example of the method, optionally including one or both of the first and second examples, the method may include draining the oil from the shaft toward a drain opening arranged at a lower end of the electric turbocharger.

As used herein, an element or step recited in the singular and preceded with the word "a" or "an" should be do not exclude plural of said elements or steps, unless such exclusion is explicitly stated. Furthermore, references to "one embodiment" or "one example" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbocharger system, comprising:
   a shaft coupling a compressor wheel to a turbine wheel;
   an electric machine including a stator encircling the shaft between the compressor wheel and the turbine wheel; and
   an oil supply passage formed in a housing of the electric machine and fluidly coupled to a first oil nozzle, the first oil nozzle spraying a jet of oil against an exterior surface of the shaft.

2. The turbocharger system of claim 1, wherein the housing of the electric machine defines a buffer air passage extending between the compressor wheel and a sealed chamber at the turbine wheel.

3. The turbocharger system of claim 2, further comprising a compressor bearing carrier supporting a thrust bearing, wherein the buffer air passage defines a first passage section formed in the compressor bearing carrier and a second passage section formed in the housing of the electric machine.

4. The turbocharger system of claim 3, wherein the second passage section opens directly to the chamber.

5. A turbocharger system, comprising:
   a shaft coupling a compressor wheel to a turbine wheel;
   an electric machine including a stator encircling the shaft between the compressor wheel and the turbine wheel;
   an oil supply passage formed in a housing of the electric machine and fluidly coupled to a first oil nozzle oriented toward the shaft; and the housing of the electric machine defining a buffer air passage extending between the compressor wheel and a chamber at the turbine wheel, wherein while the chamber is pressurized, a seal plate defining a wall of the chamber is biased toward the turbine wheel.

6. The turbocharger system of claim 1, further comprising a thrust bearing coupled to the shaft, wherein the shaft is a rotor of the electric machine, with a length between the thrust bearing and the compressor wheel being smaller than a length between a tip of the first oil nozzle and the compressor wheel.

7. The turbocharger system of claim 1, further comprising a compressor bearing carrier supporting a thrust bearing, wherein the oil supply passage includes a first oil passage section formed in the compressor bearing carrier and a second oil passage section formed in the housing of the electric machine.

8. The turbocharger system of claim 7, wherein the first oil nozzle joins directly to the oil supply passage at the first oil passage section.

9. The turbocharger system of claim 7, further comprising a second oil nozzle oriented toward the shaft, opposite to the first oil nozzle, with a tip of the first oil nozzle facing a tip of the second oil nozzle.

10. The turbocharger system of claim 9, wherein the second oil nozzle joins directly to the oil supply passage at the second oil passage section, and wherein the oil supply passage fluidly couples to a pressurized engine lube oil feed.

11. A system, comprising:
a turbocharger including a compressor, a turbine, and a compressor bearing carrier;
an electric machine within the turbocharger including a housing and a rotor extending through each of the housing and the compressor bearing carrier; and
an oil supply passage formed through each of the housing and the compressor bearing carrier, the oil supply passage carrying oil which flows against an exterior surface of the rotor.

12. The system of claim 11, further comprising a buffer air passage fluidly coupling the compressor to a chamber at the turbine, wherein the chamber is pressurized to act against a thrust force of the turbine.

13. The system of claim 11, wherein the oil supply passage fluidly couples a nozzle encircled by the compressor bearing carrier to an oil source.

14. The system of claim 11, wherein the rotor couples a compressor wheel of the compressor to a turbine wheel of the turbine.

15. A method, comprising:
flowing oil through an oil supply passage of an electric turbocharger to an oil nozzle arranged within the electric turbocharger, and
spraying the oil from the oil nozzle against surfaces of a shaft extending through an electric machine of the electric turbocharger and coupling to each of a compressor wheel and a turbine wheel.

16. The method of claim 15, further comprising providing pressurized air to a chamber at the turbine wheel via a buffer air passage extending through a housing of the electric turbocharger.

17. The method of claim 15, further comprising draining the oil from the shaft toward a drain opening arranged at a lower end of the electric turbocharger.

18. The method of claim 15, further comprising propelling oil via a bearing, and the oil nozzle extending outward from a region of the propelled oil.

19. The method of claim 15, further comprising positioning an inner wall of a compressor volute between a compressor wheel and an outer wall of the compressor volute relative to a longitudinal axis of the shaft.

\* \* \* \* \*